US008597030B2

(12) United States Patent
Aaron

(10) Patent No.: US 8,597,030 B2
(45) Date of Patent: Dec. 3, 2013

(54) ELECTRONIC PROFILE BASED EDUCATION SERVICE

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3012 days.

(21) Appl. No.: 10/955,161

(22) Filed: Sep. 30, 2004

(65) Prior Publication Data

US 2006/0040248 A1  Feb. 23, 2006

Related U.S. Application Data

(63) Continuation-in-part of application No. 10/924,072, filed on Aug. 23, 2004, now Pat. No. 7,735,091.

(51) Int. Cl.
*G09B 3/00* (2006.01)

(52) U.S. Cl.
USPC .......................... 434/322; 434/323; 434/350

(58) Field of Classification Search
USPC .................... 434/323, 350, 365, 118, 322
See application file for complete search history.

(56) References Cited

U.S. PATENT DOCUMENTS

| | | | | |
|---|---|---|---|---|
| 5,810,605 A * | 9/1998 | Siefert | | 434/362 |
| 5,879,163 A * | 3/1999 | Brown et al. | | 434/236 |
| 5,967,793 A * | 10/1999 | Ho et al. | | 434/362 |
| 6,260,041 B1* | 7/2001 | Gonzalez et al. | | 707/10 |
| 6,270,351 B1* | 8/2001 | Roper | | 434/118 |
| 6,343,319 B1* | 1/2002 | Abensour et al. | | 709/219 |
| 6,347,333 B2* | 2/2002 | Eisendrath et al. | | 709/217 |
| 6,507,726 B1* | 1/2003 | Atkinson et al. | | 434/350 |
| 6,884,074 B2* | 4/2005 | Theilmann | | 434/118 |
| 6,987,945 B2* | 1/2006 | Corn et al. | | 434/350 |
| 7,050,753 B2* | 5/2006 | Knutson | | 434/350 |
| 7,065,512 B1* | 6/2006 | Bertrand et al. | | 706/45 |
| 7,065,550 B2* | 6/2006 | Raghunandan | | 709/203 |
| 2002/0049743 A1* | 4/2002 | Hall | | 707/1 |
| 2002/0111994 A1* | 8/2002 | Raghunandan | | 709/203 |
| 2002/0169770 A1* | 11/2002 | Kim et al. | | 707/5 |
| 2003/0078934 A1* | 4/2003 | Cappellucci et al. | | 707/101 |
| 2003/0208482 A1* | 11/2003 | Kim et al. | | 707/3 |
| 2004/0002050 A1* | 1/2004 | Wagner et al. | | 434/362 |
| 2004/0110119 A1* | 6/2004 | Riconda et al. | | 434/350 |
| 2004/0161734 A1* | 8/2004 | Knutson | | 434/335 |
| 2004/0205811 A1* | 10/2004 | Grandy et al. | | 725/28 |
| 2004/0220935 A1* | 11/2004 | McGraw et al. | | 707/10 |
| 2005/0019740 A1* | 1/2005 | Cunningham et al. | | 434/350 |
| 2005/0277099 A1* | 12/2005 | Van Schaack et al. | | 434/322 |

OTHER PUBLICATIONS

Heterogeneous Sensor Networks. Intel Technology Journal, 2003 [online], [retrieved Feb. 22, 2005]. Retrieved from the Internet: <URL: http://www.intel.com/research/exploratory/heterogeneous.html>.

Butler, Jim. Mobile robots as gateways into wireless sensor networks, LinuxDevices.com, last updated May 2, 2003 [online], [retrieved Feb. 22, 2005]. Retrieved from the Internet: <URL: http://linuxdevices.com/articles/AT2705574735.html>.

Green, Heather. Tech Wave 2: The Sensor Revolution. BusinessWeek Online, Aug. 25, 2003 [online], [retrieved Feb. 22, 2005]. Retrieved from the Internet: <URL: http://www.businessweek.com/magazine/content/03_34/b3846622.htm>.

\* cited by examiner

*Primary Examiner* — Bruk Gebremichael

(74) *Attorney, Agent, or Firm* — Myers Bigel Sibley & Sajovec

(57) ABSTRACT

An electronic education service module identifies a target education topic for a user and obtains user profile information associated with the user from a database communicatively coupled to the electronic education service. A plurality of tasks to provide the target education topic are identified based on the identified target education topic and the obtained user profile information. Execution of actions by application service providing modules, other than the electronic education service, to carry out the identified tasks is requested to provide the target education topic to the user.

17 Claims, 5 Drawing Sheets

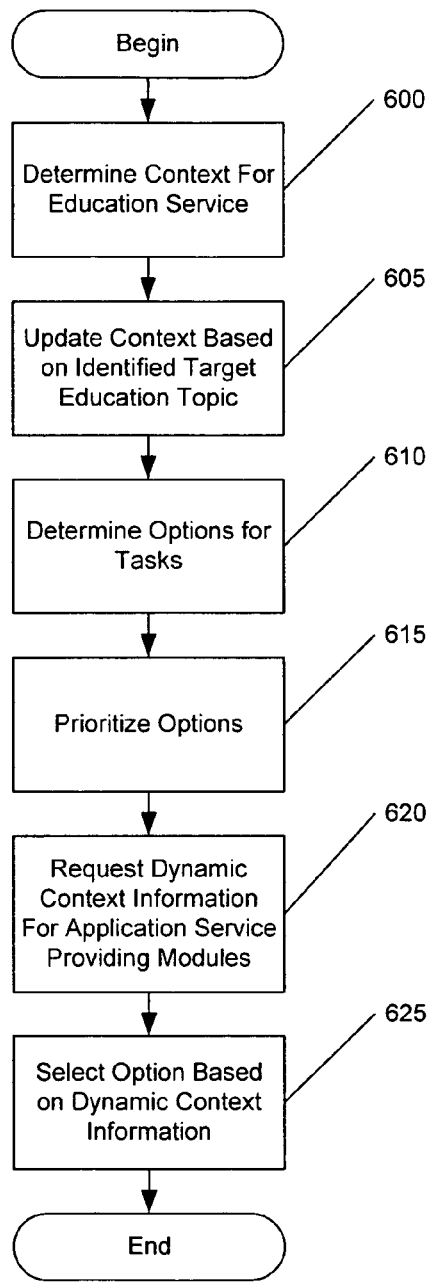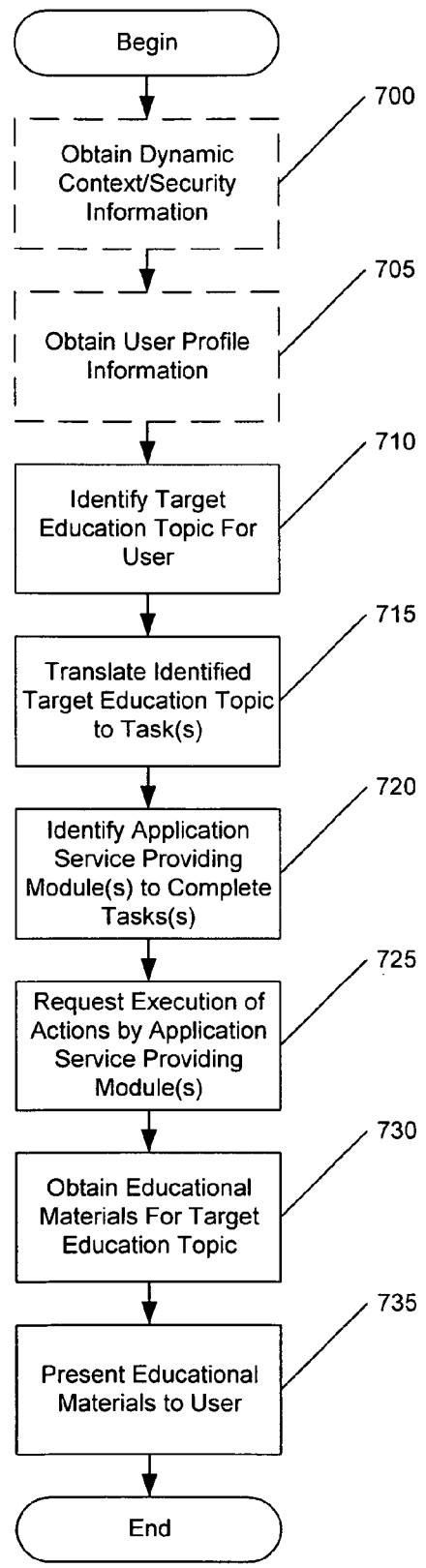
Figure 6
Figure 7

ELECTRONIC PROFILE BASED EDUCATION SERVICE

RELATED APPLICATIONS

This application is a continuation-in-part of U.S. patent application Ser. No. 10/924,072 entitled "METHODS, SYSTEMS AND COMPUTER PROGRAM PRODUCTS FOR PROVIDING APPLICATION SERVICES TO A USER," filed Aug. 23, 2004 now U.S. Pat. No. 7,735,091, which is incorporated herein by reference as if set forth in its entirety.

FIELD OF THE INVENTION

This invention relates to computing devices, and more particularly to such devices supporting a variety of different applications.

BACKGROUND OF THE INVENTION

Computing devices are used for providing a wide variety of applications support to users. As used herein, the term "computing device" refers to any equipment with computational capability or that is integrated with equipment with computational ability. Accordingly, as used herein, computing device can include one or more enterprise, application, personal, pervasive and/or embedded computer systems that perform computational operations and associated input and/or output devices or components thereof. Examples of computing devices, as used herein, include computer workstations, personal digital assistants, cell phones, email pagers, automobile navigation systems, and computer-controlled appliances.

As computing devices and application programs for the same evolve, along with networks interconnecting such devices, the range of customer (user) services that can be provided by computing devices is becoming increasingly complex. As a result, some customers are experiencing problems in assimilating and utilizing these computing device based application services. As a result, despite the range of available services, service functionality is generally self-limited and self-defeating and different types of application services are generally developed separately, often with only an operating system, such as the WINDOWS™ operating system from Microsoft Corporation, in common. While such an operating system may provide an integrated framework allowing application programs to access hardware of a computing device, no integrating framework at an application level is provided, even though technology is becoming available which may be used to enable such a framework (e.g., Web Services and Liberty Alliance using extensible markup language (XML) over Simple Object Access Profile (SOAP) over hypertext transport protocol (HTTP) over Internet protocol (IP)).

Re-usable components for application services programs may include, for example, small pieces like code objects, a few types of standard "servers" such as Remote Authentication Dial-In User Service (RADIUS) and, a small number of standard "functions" such as authentication. As a result, such service offerings generally do not build on each other and no model or method may be available to facilitate needed interactions. Even "bundled" services, such as OFFICE™ productivity software available from Microsoft Corporation, are hardly integrated in functionality, even though they may achieve data interchange compatibility. As such, service complexity generally rises too fast for customers/users as features are added, thereby reducing ease-of-use and ultimate value to the user of such application services. In addition, architectural complexity may rise too fast for conceptual designers and developers as features are added, such that increasing errors and development time and cost may result. Furthermore, security is typically piece-meal, separate, incomplete, insufficient and/or too hard to use.

One known functionality provided, for example, by Microsoft OUTLOOK™ e-mail client and calendaring applications, is a calendar. However, while such electronic calendars are known, they are generally only partially connected to and integrated with other electronic services and networks, and, typically, provide only very limited functionality and convenience to users outside of their narrow scope of use. Electronic calendars, such as OUTLOOK™, also lack various functionalities provided by human planners or arrangers. However, human planners or arrangers, such as wedding arrangers, are typically costly and unreliable, and are not inherently connected to electronic services and networks.

Another area of interest in the application service providing area is provision of educational services. Continuing education of all sorts is in demand and a variety of such educational services are available piecemeal in a number of forms, but such resources are typically difficult and costly to obtain in a convenient, integrated fashion and these services generally are not configured to anticipate a user's needs and include in a clear manner all related information needs.

SUMMARY OF THE INVENTION

In some embodiments of the present invention, methods for providing an electronic education service to a user include identifying a target education topic for the user. User profile information associated with the user is obtained from a database communicatively coupled to the electronic education service. A plurality of tasks are identified to provide the target education topic based on the identified target education topic and the obtained user profile information. Execution of actions by application service providing modules, other than the electronic education service, is requested to carry out the identified tasks to provide the target education topic to the user. The target education topic may be identified for the user by receiving a request for the target education topic from the user.

In other embodiments of the present invention, identifying a target education topic for the user includes receiving information identifying educational material available from a resource related to an education topic. A candidate education topic is identified for the user based on the received information from the resource and the user profile information. The candidate education topic is suggested to the user and a request is received from the user designating the candidate education topic as the target education topic.

In further embodiments of the present invention, identifying a plurality of tasks to provide the target education topic includes identifying tasks to generate an education plan for the target education topic. At least one resource is identified for educational materials specified by the education plan. Tasks are also identified to provide the target education topic to the user based on the education plan. Requesting execution of actions may include requesting acquisition of the educational materials specified by the education plan from the identified resource.

In some other embodiments of the present invention, status information is received from the application service providing modules based on the execution of actions by the application service providing modules. The education plan is updated based on the received status information. The status information may include information related to completion of portions of the target education topic by the user and updating the education plan may include updating the user profile information associated with the user based on the information related to completion of portions of the target education topic.

In yet further embodiments of the present invention, identifying tasks to generate an education plan includes identifying a task to obtain approval, from an authorized user different from the user, for providing the target education topic to the user based on the user profile information. Consent may be obtained before providing the target education topic to the user. Tasks may also be identified to obtain input from the user and/or provide output to the user. One of a plurality of available personalities may be associated with the electronic education service and identifying tasks to obtain input from the user and/or provide output to the user may include identifying tasks to obtain input from the user and/or provide output to the user based on the associated one of the available personalities. The input/output communications with the user may then be based on the associated personality of the electronic education service. The associated one of the available personalities may define, for example, a communication syntax, a vocabulary, a sense of urgency, a speed of communication, a timing pattern of communication, a level of detail of communication and/or a preciseness of communication by the electronic arranger to the user.

In other embodiments of the present invention, identifying tasks to generate an education plan includes identifying a type of the target education topic and identifying tasks to generate the education plan based on the target education topic. The education plan is generated by execution of actions specified by the identified tasks.

In further embodiments of the present invention, generating the education plan includes selecting a plan framework from a plurality of predetermined plan frameworks based on the identified type of the target education topic. Modifiers are determined for the selected plan framework based on the obtained user profile information. The education plan is generated based on the selected plan framework and the determined modifiers.

In other embodiments of the present invention, a context is determined for the electronic education service and the context is updated based on the identified target education topic. The education plan is generated based on the determined context of the electronic education service. Sharing rules limiting sharing of the education plan may be specified and the education plan may be provided to a requesting user based on the determined sharing rules. Information regarding prior requests for provision of target education topics to the user may also be obtained and the plurality of tasks may be identified and/or the execution of actions may be requested based on the obtained information regarding prior requests.

In further embodiments of the present invention, a context is determined for the electronic education service and the context is updated based on the identified target education topic. Identifying a plurality of tasks includes determining a plurality of options for the plurality of tasks based on the context. The plurality of options are prioritized. Dynamic context information is requested from the application service providing modules providing the target education topic to the user. One of the plurality of options is identified as the plurality of tasks based on the requested dynamic context information.

In other embodiments of the present invention, methods for providing an electronic education service application service providing module in a framework for providing computing device executed application services to a user using a plurality of application service providing modules, each of which provides a subset of the application services to the user, include identifying a target education topic for a user. The identified target education topic is translated to at least one task to be completed. At least one of the plurality of application service providing modules, other than the electronic education service application service providing module, required for completing the at least one task, is identified. The identified tasks include obtaining educational materials associated with the target education topic. Execution of actions by the identified at least one of the plurality of application service providing modules is requested to complete the at least one task. The educational materials associated with the target education topic are obtained and the educational materials are presented to the user.

In further embodiments of the present invention, user profile information is associated with the user and the identified target education topic is translated to at least one task based on the user profile information. A security module may be communicatively coupled to the electronic education service application service providing module and identifying at least one of the application service providing modules and/or requesting execution of actions by the identified at least one of the plurality of application service providing modules to complete the task may include obtaining security context information from the security module and identifying at least one of the application service providing modules and/or requesting execution of actions by the identified at least one of the plurality of application service providing modules based on the obtained security context information from the security module.

In some other embodiments of the present invention dynamic context information associated with the application service providing modules is obtained. At least one of the application service providing modules is identified and/or execution of actions by the identified at least one of the plurality of application service providing modules is requested based on the obtained dynamic context information.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIGS. 3-7 are flowcharts of operations that may be performed according to various embodiments of the present invention.

DETAILED DESCRIPTION

Figure 1:
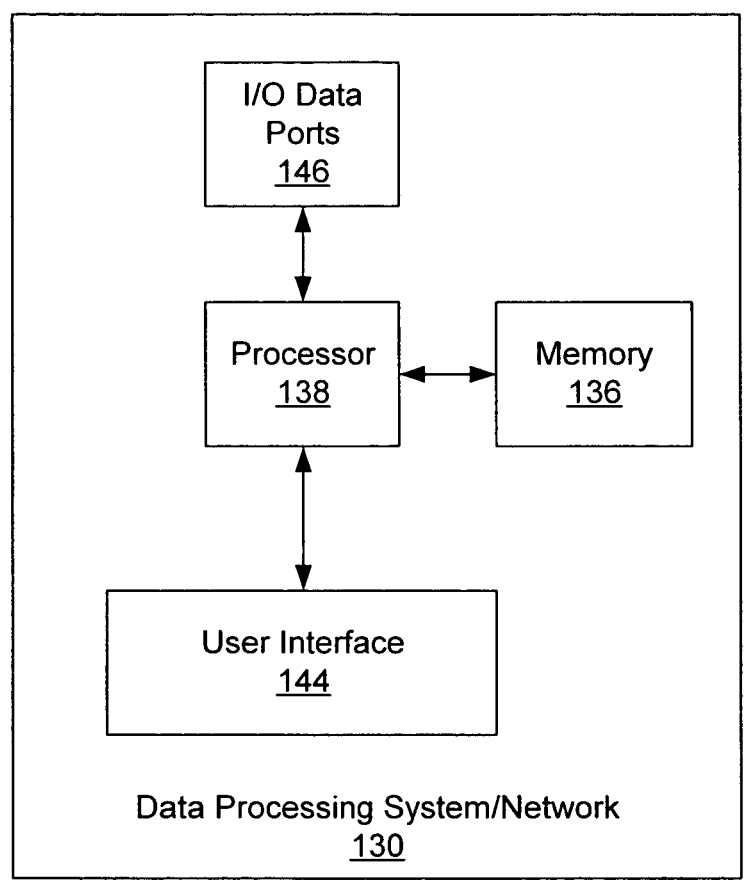
FIG. 1 is a block diagram of a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

FIG. 1 illustrates an exemplary embodiment of a computing device or data processing system 130 configured in accordance with embodiments of the present invention. The data processing system 130, which may be incorporated in, for example, a personal computer, a PDA, a wireless terminal/phone, a smart appliance or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet protocol (IP) connection. These components may be conventional components such as those used in many conventional data processing systems, which may be configured to operate as described herein.

Figure 2:
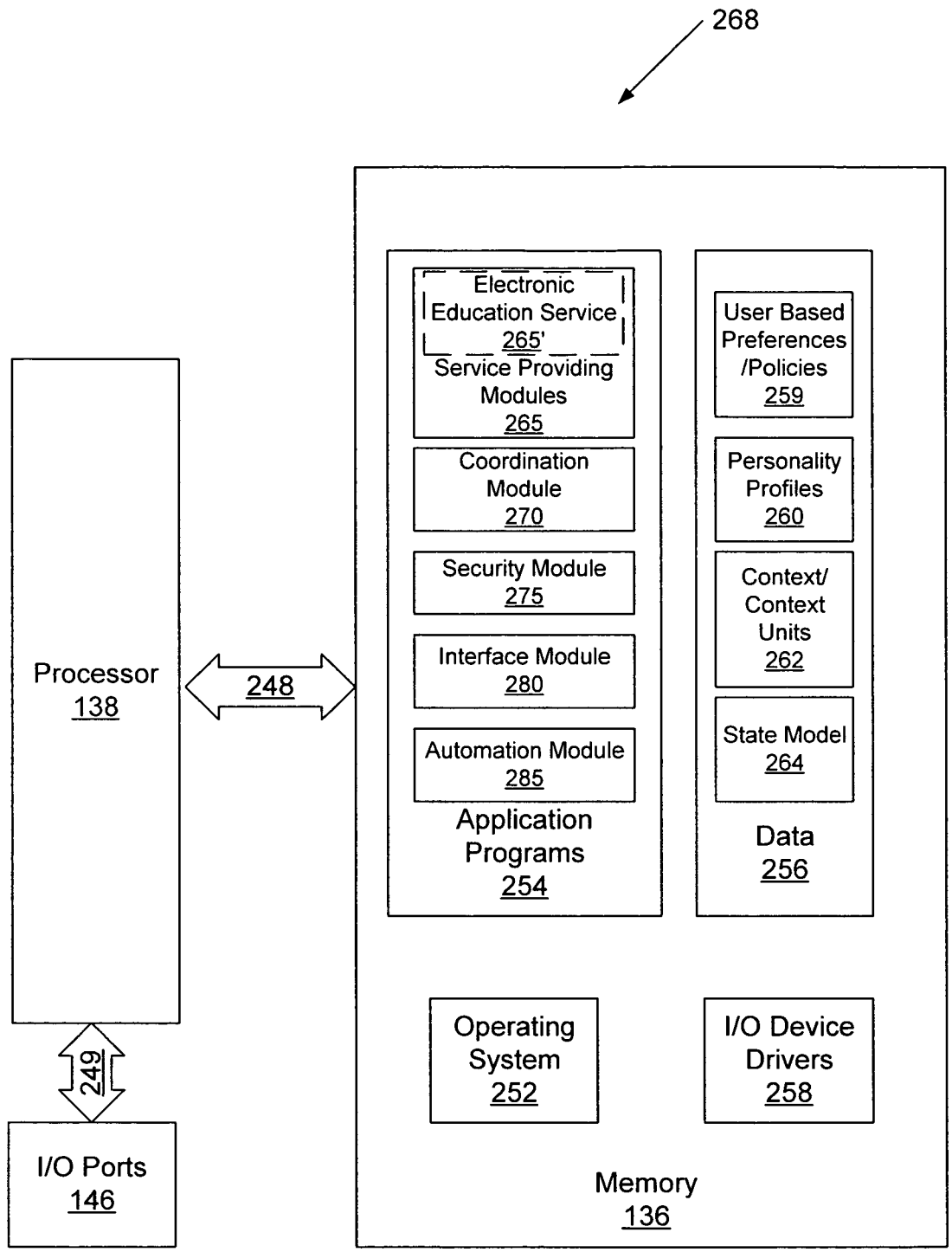
FIG. 2 is a block diagram of a system for providing application services to a user according to some embodiments of the present invention.

Referring now to FIG. 2, a block diagram of a system 268 for providing an electronic calendar is provided that illustrates systems, methods, and computer program products in accordance with embodiments of the present invention as will now be discussed. The processor 138 communicates with the memory 136 via an address/data bus 248. The processor 138 can be any commercially available or custom enterprise, application, personal, pervasive and/or embedded microprocessor, microcontroller, digital signal processor or the like. The memory 136 may include any memory devices containing the software and data used to implement the functionality of the data processing system 130. The memory 136 can include, but is not limited to, the following types of devices: ROM, PROM, EPROM, EEPROM, flash memory, SRAM, and DRAM.

As shown in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2™, AIX™ or zOS™ from International Business Machines Corporation, Armonk, N.Y., WINDOWS 95™, WINDOWS 98™, WINDOWS 2000™, WINDOWS CE™ or WINDOWS XP™ from Microsoft Corporation, Redmond, Wash., PALM OS™, SYMBIAN OS™, CISCO IOS™, VXWORKS™, UNIX™ or LINUX™. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the system 268 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As further illustrated in FIG. 2, according to some embodiments of the present invention the application programs 254 include application service providing modules 265 and a coordination module 270. In addition, a security module 275, an interface module(s) 280 and/or an automation module 285 may be provided. Other embodiments of the present invention include the service providing modules 265 and the security module 275 and optionally other of the modules. The service providing modules 265 are application service providing modules, each of which provides a subset of the application services to a user supported by the system 268 for providing computing device executed application services to a user. In some embodiments of the present invention, the coordination module 270 is configured to translate requests from a user to need(s) and to schedule execution of actions by ones of the plurality of application service providing modules 265 to satisfy the need(s). The security module 275 may be configured to receive security context information from ones of the plurality of applications service providing modules 265, define a security level global context based on the received security context information and communicate the security level global context to the plurality of application service providing modules 265. The interface module(s) 280 in some embodiments of the present invention are not visible to the user, whereas the application service providing modules 265 may be visible. The interface module(s) 280 may communicatively couple the application service providing modules 265 to each other and dynamically restrict communications in-progress between the application service providing modules 265. The automation module 285 may be configured to receive information regarding user requests and needs and predict future needs for the user and possible actions based on processing rules for the user.

In other embodiments of the present invention, the data 256 includes one or more personality profiles 260. One or more of the application service providing modules 265 is configured to incorporate a selected one of the plurality of personality profiles 260 to provide an interface to a user having characteristics defined by the selected one of the personality profiles 260.

In yet other embodiments of the present invention, one or more of the application service providing modules 265 is provided a respective subset of the application services to be provided to the user that is grouped based on an anthropomorphic model of non-computing device based providers of corresponding application services. In other words, the grouping of services supported by a particular application service providing module may be modeled in a manner where the grouping of services for a particular module are based on human counterpart service providers rather than a programming model or the like. The anthropomorphic model subsets of each application service providing module may then be communicatively coupled by the interface module(s) 280.

The security control module 275 may be configured to communicate with the application service providing modules 265 to define an integrated security model for the system to control operations of the application service providing modules 265 based on the integrated security model. The interface module(s) 280 may be configured to communicatively couple the application service providing modules 265 and filter communications between the application service providing modules 265 based on the integrated security model. The security control module 275 may be configured to communicate with the interface module(s) 280 to define the integrated security model. Thus, the integrated security model may be utilized to control both the sending of messages by the application service providing modules 265 and to control filtering out of messages to and from the application service providing modules 265 at the interface module(s) 280. The integrated security model may also be used to control re-assignment of tasks or services from one or a group of application service providers to another one or group of same, and this may be effected by the interface module(s) and/or security-related modules.

Additional aspects of the data 256 in accordance with embodiments of the present invention are illustrated in FIG. 2. As illustrated in FIG. 2, the data 256 may include user based preferences/policies 259, the personality profiles 260, dynamic context (including context unit) information 262 and/or state machine model(s) 264. The user based preferences/policies 259 may be used to change operations for providing computing device executed application services to a user based on particular characteristics or desires of the respective user.

As discussed above, the personality profiles 260 may be used to provide a selectable personality for an application service providing module 265 for all and/or selected users. The dynamic context information 262 provides a dynamic context database accessible to the various application programs 254 that, as will be described further with reference to the flow charts below, may be used to modify operations and delivery of application services responsive to the dynamic context of various components of the system. The interlocked state machine model(s) 264 may be used to control operations and application service providing so as to provide enhanced security and control opportunities. As used herein "interlocked" state machine model(s) refers to the interrelationship between models for respective nodes or application service providing modules and/or the flows related to communications between those nodes as seen, for example, at interface module(s) between the nodes in carrying out user need fulfillment operations or other operations, as, for example, various overhead operations needed to maintain or enable basic functioning.

Also illustrated in the embodiments of FIG. 2 is an electronic education service module 265' that may be provided in a framework for providing computing device executed application services to a user using the plurality of application service providing modules 265. The electronic education service 265' may be configured to provide means for identifying a target education topic for a user and obtaining user profile information associated with the user from a database communicatively coupled to the electronic education service 265'. For example, the user profile information, like user preferences and policies information, may be included in the user based preferences/policies database 259. The electronic education service 265' may also be configured to provide means for identifying a plurality of tasks to provide the target education topic based on the identified target education topic and the obtained user profile information and for requesting execution of actions by application service providing modules, other than the electronic education service, to carry out the identified tasks to provide the target education topic to the user.

Context within an application service providing framework generally refers to detailed internal conditions/indications/assessments at various points and hierarchies within the framework, not simply to "what is being connected to," "what type of transaction is occurring," "what zone is being accessed," "what is included in the transaction," and the like. Pertinent contexts may be referred to by the various framework application service providing components, such as the electronic education service module 265', in order to self-adjust their modes of operation, options they employ, alternate approaches they use in transactions with other components, parameters they use in their internal processing, methods available in their programming, filtering of messages they receive and/or forward, and the like. By being provided access to those particular selected contexts (generated at various points throughout the framework) which (via the design and arrangement of the framework) have particular bearing on its own operations and actions, each framework component (and pre-defined component group) may be provided with the pertinent global-to-local framework knowledge that enables it to modify its operation so as to increase framework security, reliability, and functional flexibility.

As noted above, a dynamic context may be associated with the application service providing module. The "dynamic context" for an application service providing module, as that term is used herein, is dependent on a condition of another of the application service providing modules, or other modules such as infrastructure modules, that is not determinable based only on communications from the application service providing modules, or other modules, resulting from execution of application service related actions, or the actions of other modules. In other words, the dynamic context as used herein provides information related to an operational condition or security state of others of the application service providing modules, or other modules, that is not determinable merely from transaction communications generated during execution of actions to fulfill needs by the application service providing modules, or by the various functions/actions of the other modules. For implementation efficiency and convenience, this definition may be relaxed somewhat, in that the test of "not determinable" could be replaced with "not easily determinable." Thus, the dynamic context could involve a variety of different types of information.

While the present invention is illustrated with reference to the various modules 265, 265', 270, 275, 280, 285 being application programs in FIG. 2, as will be appreciated by those of skill in the art, other configurations fall within the scope of the present invention. For example, rather than being an application program, the interface module 280 may also be incorporated into the operating system 252 or other such logical division of the data processing system 130. Furthermore, while the various application programs 254 are illustrated in a single data processing system, as will be appreciated by those of skill in the art, such functionality may be distributed across one or more data processing systems. For example, the security module 275 may be resident on a distinct device from the application service providing modules 265, and various application service providing modules 265 may be resident on different devices, and distinct instantiations of the same application service providing module may be resident on different devices. Thus, the present invention should not be construed as limited to the configuration illustrated in FIGS. 1 through 2, but may be provided by other arrangements and/or divisions of function between data processing systems. In fact, as will be clear from the description herein, the functionalities of the present invention will typically be distributed across a network of communicatively coupled computing devices and may utilize a variety of input/output devices to provide application services to users.

Figure 3:
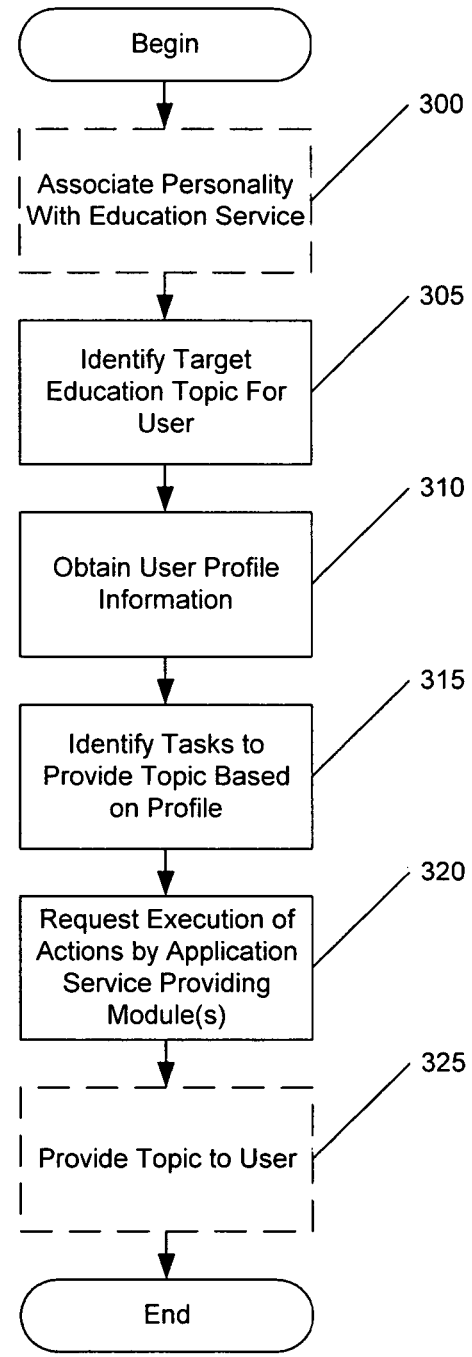

Operations according to various embodiments of the present invention will now be further described with reference to the flow chart illustrations of FIGS. 3 through 7. Referring first to FIG. 3, operations for providing an electronic education service to a user will now be described for various embodiments of the present invention. Operations begin at Block 300 with, in some embodiments of the present invention, associating one of a plurality of available personalities 260 with the electronic education service. The personality associated with the electronic education service may define non-visual characteristics of the user interaction such as one or more of an accent, a communication syntax, a vocabulary, a sense of urgency, a speed of communication, a timing pattern of communication, a level of detail of communication and/or a preciseness of communication by the electronic arranger to the user. This personality may be used in obtaining information from the user. A target education topic is identified for the user (Block 305). For example, the target identification topic may be identified by receiving a request for the target education topic from the user. In other embodiments of the present invention, as will be further described with reference to FIG. 4, the target education topic may be automatically identified and suggested to the user.

User profile information associated with the user is obtained from a database communicatively coupled to the electronic education service (Block 310). For example, user profile information characterizing education interests, learning level, learning style, learning receptivity, learning rate and the like may be stored as user profile information for respective users in the user based preferences/policies data 259. A plurality of tasks are identified to provide the target education topic based on the identified target education topic and the obtained user profile information (Block 315). Execution of actions by application service providing modules, other than the electronic education service, are requested to carry out the identified task to provide the target education topic to the user (Block 320). As illustrated for the embodiments of FIG. 3, the education service may also provide the target education topic to the user (Block 325).

Figure 4:
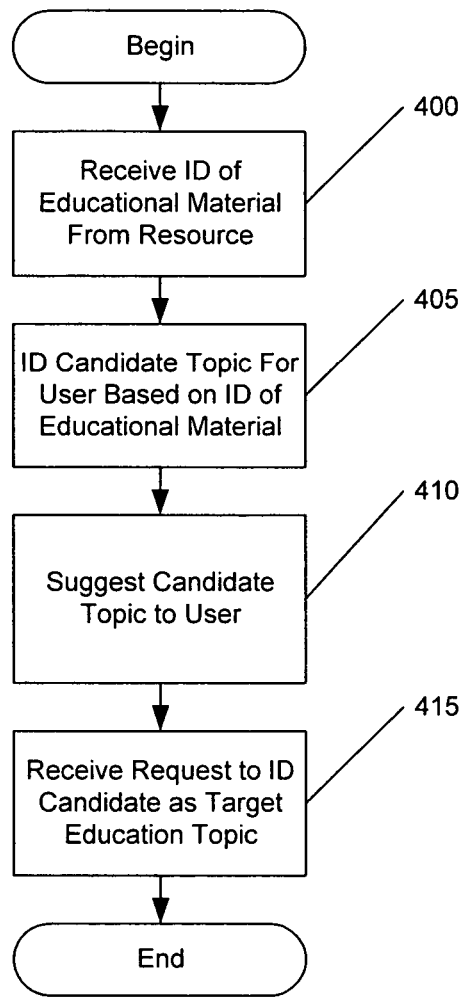

Particular embodiments of the present invention providing for identifying a target education topic for a user will now be described with reference to the flowchart illustration of FIG. 4. As shown in FIG. 4, information identifying educational material available from a resource related to an education topic is received (Block 400). For example, an educational institution or online learning resource may send notifications to the electronic educational service 265' when new educational materials related to an education topic of interest to one or more users supported by the electronic education service 265' become available. A candidate education topic is identified for the user based on the received information from the resource and the user profile information (Block 405). For example, the user profile information for a particular user may specify an interest in woodworking and educational material related to woodworking may become available from an educational institute, in which case the education service 265' may identify such materials as a candidate education topic for the user. The candidate education topic is suggested to the user (Block 410), for example, especially when the user has successfully used material from the identified information source and/or on a similar topic in the past, increasing the likelihood that the user will be interested. A request is then received from the user designating the candidate education topic as the target education topic if the user is interested in the offering (Block 415).

Operations for providing an electronic education service to a user according to further embodiments of the present invention will now be described with reference to the flowchart illustration of FIG. 5. It will be understood that a variety of different aspects of various embodiments of the present invention will now be described with reference to FIG. 5 and that not all such aspects need be included in different particular embodiments of the present invention. For the embodiments of the present invention illustrated in FIG. 5, operations begin at Block 500 by obtaining user profile information associated with the user from a database coupled to the electronic education service and/or, optionally obtaining information regarding prior requests for provision of target education topics to the user. A type of the target education topic is identified (Block 505). Tasks to generate an education plan for providing the target education topic to the user are identified based on the target education topic (Block 510). At least one resource for education materials specified by the education plan is identified (Block 515).

In some embodiments of the present invention, a context for the electronic education service is also determined, which context may be updated based on the identified target education topic (Block 520). The education plan is then generated as will now be described for particular embodiments of the present invention with reference to Blocks 525-535.

Figure 5:
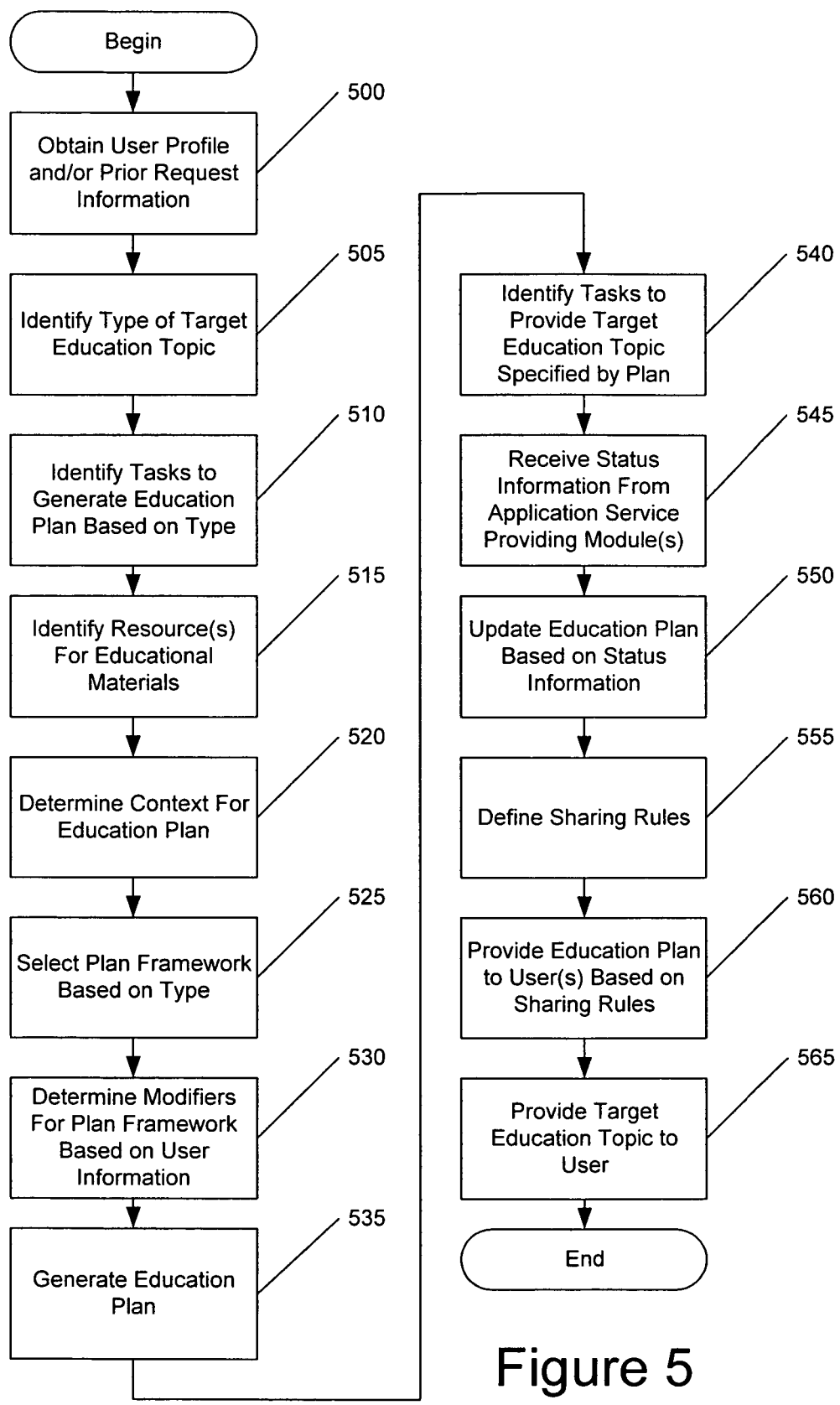

As illustrated for the particular embodiments of FIG. 5, generating an education plan includes selecting a plan framework from a plurality of predetermined plan frameworks based on the identified type of the target education topic (Block 525). Modifiers for the selected plan framework are determined based on the obtained user profile information (Block 530). The education plan is then generated based on the selected plan framework and the determined modifiers (Block 535). It will be understood that the context information identified at Block 520 and/or dynamic context information obtained from other application service providing modules may be considered in operations related to generating an education plan as described for Blocks 525-535.

Tasks to provide the target education topic to the user are also identified based on the education plan (Block 540). In some embodiments of the present invention, as illustrated in FIG. 5, status information may be received from the application service providing module supporting provision of the target education topic to the user based on the execution of actions by the application service providing modules (Block 545). The education plan may be updated based on the received status information (Block 550). For example, the information obtained at Block 545 may include information related to completion of portions or all of the target education topic by the user and the education plan may be updated, including updating the user profile information associated with the user based on the information related to completion of portions of the target education topic by the user.

Sharing rules may also be defined limiting sharing of the education plan (Block 555). The education plan may be providing to a requesting user based on the determined sharing rules (Block 560).

The target education topic may then be provided to the user (Block 565). Providing the education topic to the user may include carrying out execution by application service modules of the tasks identified at Block 540. For example, acquisition of the educational material specified by the education plan may be requested from an identified resource providing the educational materials. The educational materials may be provided free of charge or, where provided at a charge, relative costs and availability of the educational materials from different resources may be considered in the acquisition of the educational materials from a selected resource. Acquisition may also include providing for payment for the educational materials.

Operations at Block 565 may also include obtaining input from the user and/or providing output to the user as part of the provision of the target education topic to the user. The interface with the user may be based on a selected personality associated with the education service as discussed with reference to Block 300 of FIG. 3 above. Furthermore, in some instances, the user profile information may specify security related limitations on the provision of the target education topic to the user. For example, the user may be designated as a minor in the user profile information and the education service may identify a task at Block 540 requiring obtaining of approval from an authorized user different from the user, such as the user's parent, for providing the target education topic to the user. It will also be understood that various of the operations described above, in addition to being optionally dependent on the user profile information and context information, may also be dependent on the prior request information obtained at Block 500.

Operations for providing an electronic education service to a user will now be further described for particular embodiments of the present invention with reference to the flow chart illustration of FIG. 6. As shown in FIG. 6, operations begin at Block 600 by determining a context for the electronic education service. The context may be updated based on the identified target education topic (Block 605). Operations related to identifying a plurality of task to provide the target education topic will now be described with reference to Blocks 610 through 625 of FIG. 6.

A plurality of options for the plurality of tasks to provide the target education topic are determined based on the context of the electronic education service, user profile information and/or dynamic context information related to other application service providing modules to be utilized in providing the target education topic (Block 610). The plurality of options are prioritized, for example, as first (or best) option, second best option, third best option and so on (Block 615). The prioritization of the options may similarly be based on context or other information available to the electronic education services application service providing module. As shown for the particular embodiments of FIG. 6, dynamic context information is requested from the application service providing modules supporting provision of the target education topic to a user (Block 620). One of the plurality of options is identified as the task to be completed to provide the target education topic based on the requested dynamic context information and/or the priority of the options (Block 625).

Operations for providing an electronic education service application service providing module 265' in a framework for providing computing device executed applications services to a user using a plurality of application service providing modules, each of which provides a subset of the application services to the user, will now be described for particular embodiments of the present invention with reference to the flowchart illustration of FIG. 7. As shown at Block 700, dynamic context information associated with application service providing modules supporting provision of the electronic education service application service providing modules may be obtained. For example, security context information may be obtained from a security module of the framework communicatively coupled to the electronic education service application service providing module. User profile information associated with the user may be obtained (Block 705).

A target education topic is identified for the user (Block 710). The identified target education topic is translated to one or more tasks to be completed in order to provide the target education topic to the user (Block 715). One or more of the application service providing modules within the framework, other than the electronic education service application service providing module, are identified for completing the at least one task (Block 720). The identified tasks may include obtaining educational materials associated with the target education topic.

Execution of actions by the identified application service providing module(s) is requested to complete the task(s) (Block 725). As a result, the educational materials associated with the target education topic may be obtained (Block 730) and the educational materials may be presented to the user (Block 735). The identification of application service providing modules at Block 720, the translation of identified target education topic to task as Block 715 and the execution of actions requested at Block 725 may each be determined based on dynamic context information, such as security information, obtained at Block 700 and/or the user information obtained at Block 705.

Some embodiments of an electronic education service will now be further described where the electronic education service is an application service providing module integrated within an application service providing framework with other application service providing modules. For these particular embodiments, the electronic education service is connected to other application service providing modules and to other networks, which may be supporting frameworks for different users/groups of users. Such embodiments of the present invention may thereby provide enhanced and expanded education service-related functionality to users, may anticipate the needs of the user (based, for example, on profile information and learning capabilities) and may build education frameworks to aid the user by automating the continuing education process. Exemplary education service related functions include: relating various educational information to a user profile; generating/updating user profile information related to educational needs; automatically building and utilizing a specific education plan for a user; obtaining/downloading educational information (including purchasing same if required); managing and presenting educational information; and/or, where desired, anticipating user needs and acting on anticipated user needs based on specified rules.

The framework may be an ASPIC framework that may then engage other component modules as described in U.S. patent application Ser. No. 10/924,072 entitled "METHODS, SYSTEMS AND COMPUTER PROGRAM PRODUCTS FOR PROVIDING APPLICATION SERVICES TO A USER," filed Aug. 23, 2004, which was incorporated herein by reference above as if set forth in its entirety. The primary visible component for interactions with the user may be an educator module of the electronic education service, which may have settable personalities approximating desired interactivity characteristics. The educator of the electronic education service may, in turn, access other ASPIC framework components as needed, such as a database of user profiles, history and the like, a Composer application service providing module that initiates ASPIC framework actions, a Security Controller module to access security checks and similar functions, and a Mediator application service providing module that supports access to other visible application service providing modules within the framework or external resources. The ASPIC framework may then engage different modules as needed. The Processing flows may include: providing output(s) to the user, to the ASPIC framework and/or to external (outside the framework) resources; Input>ASPIC processing>output; Timed events (created by previous ASPIC framework processing)>processing>output; ASPIC events>processing>output and External events>processing>output.

An exemplary process flow for some embodiments of an electronic education service in an ASPIC framework will now be described. A main process loop seeks (direct or mediated) input. The input may be from a user (e.g., user requests education on a particular subject, from other ASPIC modules (e.g., an electronic arranger (Planner) requests the education service module to provide an education service to prepare a user for an upcoming calendar event or occasion being planned) and/or from external network-interfaced devices/systems (e.g., external offers of Education service related services or updates, external responses to education service module requests, shared education-related resources, such as profile(s) at local community colleges and the like). Upon receiving input, the main process loop may temporarily branch to appropriate sub-processes based, for example, on input type, source and/or, value. The sub-process typically performs actions or requests, moderated by context. The sub-process may call other sub-processes and/or may interface with the ASPIC framework as needed. The sub-process obtains associated result(s), then may branch to an output process that may provide output to a user as appropriate. As with inputs, the output process for the education service module may be based on an associated settable personality. The output may be generated responsive to a particular input or as a timed event, which may be based on earlier user and/or other source input or occurrence.

The output process may also provide output to other modules of the ASPIC framework as appropriate. This output may be responsive to input or as a timed event, which may be based on earlier user and/or source input or occurrence. In addition, status reports may be generated as needed. Flows may then return to the main process loop.

An exemplary input may be a user request for education regarding a particular technical area, for example, related to a career or hobby of the user. The education service module may, in some embodiments, suggest specific instances of continuing education regarding profiled user interests without waiting on a user request. In some embodiments of the present invention, the input is classified/identified (e.g., as career education, user-requested) and the context of the education services module may be updated based on the input and/or classification. The education area or topic may also be identified by the education service module. In this process framework databased may be accessed, for example, for identifying data regarding areas/topics. Best-match identifying data may be associated with input(s). Needs and resulting action may then be determined. The Security Controller may be consulted, for example, if the user is a minor, for parental control purposes. In addition, related information (e.g., profiles) for a particular user and educational area/topic can be determined. Options may be determined, such as "build Ed plan," "request preferences," "set-up associated schedules," "gather related free Ed materials," "purchase Ed materials," "request external Ed service," "update Ed plan status," "selectively share Ed plan views" and the like The options may then be prioritized to allow selection of a best option (or option sequence), 2nd best, 3rd best, and so on, for the current context.

Execution of actions within the ASPIC framework may then be initiated based on the selected option or sequence. One or more needs may be formulated and sent to the Composer application service providing module, for example, to request purchase of highest-rated educational materials. The Composer may then cause the actions to be carried out by other modules within the framework to, for example, build an educational plan, purchase materials, add the event to history and the like. Responses to actions may include a user viewing materials according to a specified schedule and then the user proceeding with the educational plan, which may cause further purchases. Another response may be that the user rejects proffered materials and requests alternative materials or an alternative educational approach. Such subsequent input may be classified and the context of the education service module may be updated as needed. For example, the status of the education plan for the area/topic may be updated as user makes progress on the area/topic under the education plan.

An example of data associated with an education plan supported by an education service module according to some embodiments of the present invention will now be described. An area or topic may be designated for the educational service as well as a sub-area or sub-topic if applicable (to define a model for the plan that may be selected from a plurality of predefined optional plan models). Modifiers specific to the particular instance of the area/topic or sub-area/sub-topic may be specified. For example, modifiers may include an urgency, a level-of-need, a financial specification and/or privacy/security considerations. The associated data for the educational service supported by the education plan may also include a designation of participants (if more than the user alone). The participants may be tracked as individuals or categorized into groups. The sources/providers of materials and/or services may be identified (and may also include a status: indication such as, initial or tentative, updated and final). The materials and/or services to be utilized may also be specified along with a cost, if any, for the materials and/or services.

A desired result of the educational service supported by the education plan may be designated, which may be specified in general along with key details. Major building blocks for providing the educational service may be specified. For each such major building block, associated data records may include a source (with a specified contact if applicable, with an instructor if a course is being sourced and/or with assistant(s) as appropriate), a target schedule (initial, updated, final), payment or fulfillment info and/or status of delivery of the educational service based on the education plan. An overall schedule may be provided in the plan, which may include sequential and/or parallel flows, with dependencies. Major milestones/decision points/alarm points may be specified. An overall current status may be designated, which may include an expected completion date. Payment/funding/billing information may also be included in the education plan, which information may include associated user preferences.

The electronic education service as described herein may operate in cooperation with various other application service providing modules. For example, scheduling of events may be provided to the electronic education service by an electronic calendar such as described in U.S. patent application Ser. No. 10/955,160 entitled "An Electronic Calendar", which is incorporated herein by reference as if set forth in its entirety. The electronic education service may further interact with an electronic butler as described in U.S. patent application Ser. No. 10/954,502 entitled "An Electronic Butler For Providing Application Services To A User", which is incorporated herein by reference as if set forth in its entirety. In addition, development of an education plan for an educational service may be initiated by an electronic arranger such as described in U.S. patent application Ser. No. 10/955,187 entitled "An Electronic Arranger", which is incorporated herein by reference as if set forth in its entirety.

To further illustrate some embodiments of the present invention, usage of a simplified (Complete Simplification (CS)) application service framework including an electronic education service according to some embodiments of the present invention will now be described for a hypothetical household including parents, Jim (age 55) and Martha (age 49), their children Megan (age 25), Jason (age 20), Tom (age 15) and Tia (age 10). The family has two pets, named Spot (a dog) and Mittens (a cat). Jim is an accounting manager at a large corporation. Martha runs a part-time business out of their home. Megan works as a salesperson at a discount retailer, while Jason attends a downtown university. Tom and Tia attend local high school and middle school, respectively. The CS framework may utilize the home network, cellular and hotspot networks and Internet services and could be thought of as a "catch-all" for a number of related services potentially bundled together, but may also be a highly-integrated holistic service in its own right.

The framework, when using the Internet Protocol (IP) suite, may be viewed as an evolved IP centric integration of many possible applications that could leverage the flexibility and capability of next generation networking (both wireless and wire-line). It might also be viewed as a richly featured artificial intelligence network for IP. Network/service providers may operate as mediators, providing the logical integration used to obtain the full feature set and capabilities described and possibly to conduct billing, provide high availability & scalability, ensure security, provide automated backups and the like. Various enabling technologies such as wireless local area network (WLAN), BLUETOOTH™ wireless technology, Ultra Wide Band (UWB), integrated wireless-wireline, web services, virtual private network (VPN), biometric & smartcard authentication, non-repudiation, digital rights management (DRM), and the like may be used in providing the framework, however, the depiction described herein does not focus on the enabling technologies. In addition, while this example is presented primarily in a household context, it will be understood that it is likewise extendible to a business environment.

Proceeding now with the example, in the morning, each family member wakes (Megan awakes remotely from the rest of the family in her own apartment, but is included as part of the household by logical association by the CS framework/service. Information and Entertainment components of the CS service provide the appropriate content (variable by user) to each person in the family, and likewise provide the appropriate controls or commands to each wireless-connected device previously associated with each person (or persons). For example, WLAN-controllable and/or BLUETOOTH™-controllable appliances like clock radios, TV tuners, sound systems, lamps or light switches, and the like may be controlled by the CS service via the home gateway and wireless slaves or repeaters. Power-line communication technology could also be used.

Like the rest of the family, Jason wakes and takes a bleary look at the customized news feed, but unlike them he goes back to sleep since his first class is in the afternoon and his class load does not require studying this morning. He recalls he needs to update his schedule so that it better reflects his study habits of the last week or two. Sensing that he does not actually get up, the news feed switches to light jazz (streaming audio) at low volume.

Jim leaves the house for work. In his car he listens to informational MP3's (e.g., audio books or articles) downloaded automatically during the night according to his reading and continuing education settings, first a section of a new bestselling historical novel and then a short briefing on a particular accounting method revising the generally accepted practices central to his profession.

In her car, Megan is driving to see her mother, listening to some new music MP3 files downloaded last night by the CS Entertainment component according to her preferences. Preferences could be detailed or general. Each component could remember preferences for each user. Some preferences could be learned over time, while others would be selectable by the user. Selectable preference profiles might also be used. As it is on her way, she often drops by to have breakfast with her mom prior to being at the store by opening time. As she drives, she tells the car to copy some of the MP3 songs to her sister Tia, subject to applied DRM parameters where a security component of the CS service may block the copy operation. She knows Tia would like this sort of music, and because they commonly share files she is sure Tia does not already have the particular selections.

Martha does some planning for the family while making breakfast and seeing everyone off. A Planner component lists upcoming tasks with known deadlines, including needed pet vaccinations. She finds that the Planner, utilizing the Communicator component, has already checked with the veterinarian's office, for which the CS service authenticates the veterinarian's office computer, and has cross-checked her own schedule, and is suggesting several available appointment times this week to get the required rabies vaccinations for Spot and Mittens. Selecting the one she prefers, the appointment is automatically completed, verified by the vet's office almost immediately, and transferred to her phone/PDA according to her preferences. Martha also notices that Jim's car has notified, for example, by wireless message transmission, the Planner that it is nearly due for an oil change, so she flags that for his attention, in effect raising its priority and sending it to his phone for him to consider (the Planner will remind them again if not scheduled within the next week).

When Megan arrives, the CS Butler component informs Martha that her daughter is entering the driveway. The Butler component may perform some of the typical tasks traditionally associated with a live butler. It might be customizable in many ways, store preferences for household and user, and be selectable in terms of "personality," as for instance Martha prefers an "Italian" rather than an "English" Butler. Megan uses the thumb-scanner on her phone to unlock, subject to biometric authentication and/or smartcard and private key verification, the side door and makes her way to the kitchen where her mother is warming breakfast. They visit for a half-hour or so. When Megan leaves for work Martha turns to her home business, reviewing updated summaries prepared last night by her Business Assistant. Today, it helps prepare her for an upcoming lunch meeting.

Tom and Tia are on their buses headed for school. High school is tough for Tom this year since he is in advanced placement classes. He pulls up his latest summary session on his data phone to review the points he was having difficulty understanding last night.

Tia's middle school class plans a field trip today to the art museum. She uses her data phone to IM her friends in the other two 4th grade classes, so that they can synchronize their locators, such as global positioning system capabilities of the phone, protected for security/privacy by the CS service, to get together at the museum later. Through a Security component, Martha receives a request for locator usage from Tia's phone, and okay's the request after reviewing the authenticated/verified ID's of the other participants.

At work, Jim uses his data phone as his main phone (it switches to work mode upon sensing the work WLAN). He also stores files on the phone, and transfers files over VPN to his home office PC, with automated file transfers and mirroring. In both cases the Security component recognizes these as work files and applies appropriate restrictions and protections, such as smart card keying to Jim's identification for read restriction of the files. Note that the Security component both intercedes based on recognized context, and also proactively takes actions according to user preferences. Such actions may include arranging and protecting home computer backup data, and could support automated backup of data for Jim's employer as well. When used by an employer, it could perform additional cross-modal security functions such as monitoring home usage of work files and providing associated audit reports to the employer.

Jason eventually wakes up (his Assistant provides a timed sequence of reminders he has previously selected, or included in his selected preference profile) and heads to class. The family Planner updates his phone with various family-schedule data and merges similar information from some of his friends according to his permissions (monitored by the Security component). His Assistant notifies him of non-urgent messages from his father and brother, providing a brief summary. There may be just one Assistant, but since it maintains a different view for each user, it is convenient for each person to think of their own "personal" Assistant, Planner, Communicator, Tutor, etc. On the other hand, for a variety of reasons some CS components would likely be best thought of as shared or imposed rather than personal. For example the Butler is shared and the security component is limited in how it is controlled as it controls security policy.

At school, Tom uses his data phone to store & transfer class assignments. With mediation provided by the Security component, it can interface with the school WLAN and BLUETOOTH™ or UWB enabled PCs or laptops or projectors. Rules imposed by the school can be mediated and subsequently enforced by the Security component as well.

At the Museum, Tia downloads additional information on various exhibits into her phone using the museum WLAN. Some of her friends have downloaded info from different exhibits, and upon getting together they share data so that everyone has a full set. The Security component provides protection. For example, filters are set to firewall phone access. Downloaded data, particularly executable types, may be quarantined pending virus scanning. Scanning files may not be possible on the phone itself, but rather may require transfer to another machine. If Tia insists upon viewing or running a quarantined file before returning to home or school, the Security component may expedite scanning for that file over the cellular network depending on service settings and billing rules & limits.

At lunch, Jim uses his data phone and the restaurant WLAN to send & read messages, control his office PC so as to send requested files to colleagues, and to access his home network for personal tasks. The Security component provides needed protection so that these capabilities are safely enabled. Mediation via pre-arranged policy is provided so that an optimal balance of safety versus capability is obtained in all cases.

Martha meets a potential client for lunch, and with her laptop accesses the hotspot WLAN to access sites including her home business web site in order to present a proposal and conduct a demo while two of her partners (each at their own homes in different cities) participate in the discussion. Her Business Assistant provides reminders of important points she wanted to be certain to include. The potential client has a laptop as well, and Martha transfers certain files to that laptop upon request, while the Security component makes certain that her business-related wireless communications are protected. The Security component detects that certain files and communications as business related, and therefore sets up authenticated and encrypted tunnels to protect data transfers. Additionally, the DRM module of the Security component can enforce copyrights by limiting future sharing/copying of DRM'ed material. Note that the Security component would incorporate and direct a number of capabilities and mechanisms to protect "mobile" data.

Other family members similarly have lunch and use their phones and other devices to access network resources, access family network resources, synchronize application data, transfer messages and files, etc. In each case, the CS Security component performs appropriate mediation.

Tia is having lunch with her class at a food court near the museum, and someone with access to the hot spot there is attempting to hack into her phone. The Security component detects a known attack type, estimates the potential severity of the attack and due to that severity exceeding a set threshold, it temporarily locks down her phone's communication feature, allowing only a secure tunnel, this tunnel is strongly authenticated & encrypted, meaning it is cryptographically secure, between her phone and the Security component itself until she moves to another location or a pre-set timer expires. The event is flagged with high priority and sent both to her father's phone (with a message that the problem is currently under control) and to a central CS service security response center. The response center keeps statistics on events such as this. Using special tools such as quick-reaction rapidly-configurable deception hosts and associated monitoring, it may initiate attempts to identify/locate & trap the culprit if possible; else it may work to inoculate all CS-enabled devices against this attack and its determinable variants. Additionally, the Security component downgrades the trust rating of Tia's phone until all its files and data have been thoroughly scanned and the integrity of its system files is suitably verified. Integrity can be verified via cryptographic hashing techniques wherein current hash results can be verified identical to previously calculated results (indicating that no changes to the files have been made).

Later that afternoon, Tom and Tia return home from school. Martha and Tia conduct a short conference with Tia's grandmother, who lives in another city. To view photos and together discuss a digital video of Tia's recent piano recital, they utilize the private portion of the family's external web site. The Security component recognizes identity credentials and allows access. The external web site may have both public and private portions (either one private portion, or multiple separated private portions). All access to the private portion is logged.

Unexpectedly, Tom finds his homework easy for a change, so he finishes it early and spends the rest of the time before dinner in an on-line collaborative gaming competition using premium-billed "turbo" (increased) bandwidth & premium QoS requested from and granted by the network, with the added cost being deducted from his weekly allowance. The Communications module can make the appropriate requests via network service APIs, and the Bill Payment component can either make immediate payment, if required, or tally & queue the payment for after-hours fulfillment. Allowances can be managed by Tom's father using an appropriate CS component such as the family's Planner. In order to accommodate the various additional protocols needed for this gaming service, the family firewall's policy is temporarily altered. The packet filter rule-set is altered to temporarily allow the extra protocol traffic to pass, even though this may lessen security slightly. The extra traffic is allowed to pass only to and from Tom's PC. Accordingly, the Security component's monitoring priority is slightly increased for the duration. Tom's PC, like most of the network-attached devices in the home (and particular each computer), is equipped with a Security component agent/client, which can provide some level of system monitoring, intrusion detection, and attack blocking, also reporting back to the Security component itself for more global oversight. The actions of this agent/client can be adjusted via changing the monitoring priority to different levels appropriate to the overall security situation. Depending on the service plan selected, which Jim and Martha can change on-line at any time, this may require additional payments. If additional payments are required, they can be charged to Jim's account or added to the amount deducted from Tom's allowance balance, depending on options selected by Jim and Martha (e.g., small surcharges may be deducted from allowances while surcharges over a settable threshold may be charged to the parents, with or without requiring verification).

The game requests some personal information, and although Tom should know better he inputs the data and sends it. However, the Absolute Privacy feature of the Security component recognizes the transmitted data, intercepts it, and strips the sensitive information from the transmission. Absolute Privacy consists of network-based monitoring and blocking of sensitive information. In this case, the transmitted data is detected as a close variant of information matching an entry in a list pre-configured by Tom's father. A pop-up notifies Tom, and a medium-priority message is sent to Jim. If Tom desires, he can immediately request an exception from his father by clicking on an option in the pop-up, but he realizes he made a mistake and closes the pop-up instead. The game operates satisfactorily anyhow, so Tom soon forgets about it (although his father does not).

Jim picks up take-out on the way home from work. He and Martha have scheduled many of these occasions in advance, with the Butler, Communicator, and Bill Paying components being directed by the Planner component to arrange, order, and pay for the food in advance. Reminded by the Butler, all Jim needs to do is swing by to pick up the food, briefly checking his phone to make sure the order is correct.

Megan has dinner with friends. Jason has a late lab session. Martha tells the Butler component to chime Tom and Tia, and the family gets together for dinner. The CS service can command their phones, or nearby network-attached devices, to alert them using different tones of pre-selectable meanings (in this case a "dinner is ready" chime), or alternately can use brief digitized voice messages.

At dinner, they discuss the events of the day, casually adding items in turn to the family task list and calendar. Some items are fully detailed whereas other items require further information to be added later. Later, the CS service will remind the appropriate family members to provide the missing information if necessary.

After dinner, Jim spends a half-hour doing some preliminary on-line research regarding a serious medical condition with which Martha's father was recently diagnosed. Not wanting to take any chances that this activity would be recorded or tracked in any way, he engages the Security component's Anonymity Guard so that no record of the medical sites he accesses can be traced to him or the family. The Anonymity Guard routes his traffic through a secure proxy gateway which removes all identifying information and utilized various additional complementary techniques to ensure that no one can identify Jim by his network activity. (The Anonymity Guard also contains a built-in CALEA capability to override anonymity when directed by court order). As he gathers information, he saves files to his personal encrypted Data Vault and copies web site links to a new private section of the family internal web site he configures to allow access to Martha as well as himself. The Data Vault can be set to allow access only to the authenticated owner, or additionally to other persons as well. All data is encrypted using (at least) the public key of the owner, such that only the owner's private key allows decryption. This private key is contained in his smartcard, and is enabled only via successful biometric authentication. The family's internal web site is an expandable re-configurable intranet resource within the home, although access from outside the home can also be granted and coordinated via the Security component (with appropriate imposed policy). After more fully reviewing the information at a later date and discussing it with his wife, he may decide to utilize the Security component's Family VPN capability to arrange access for his father in-law as well. A Family VPN can be initiated between different homes when desired via the Security component and Communicator. (Jim has previously set up a semi-permanent Family VPN between the family home and Megan's apartment.)

As Jim adds links from his web browser to the private web site he just created, the Security component notices another program from Jim's PC attempting to access the Internet. The family firewall would normally allow the traffic to pass since the policy rule-set "allows" the corresponding protocol & port information typically visible to a firewall. However, the Security component is able to detect a discrepancy in the program name, in that the name claimed (and presented to the operating system on Jim's PC) is not the true name of the program. Although it has not yet been able to detect any sensitive information flowing, the Security component nevertheless flags the program traffic as dangerous so that the family firewall can block it. This is logged, and a small pop-up is activated on Jim's computer. Additionally, the Security component adds a deferred task to perform additional scanning and integrity verification on Jim's PC.

Subsequently, Jim and Tia access-her School Page, provided by the Education component. Her teachers have inputted various information, files, documents, presentations, and web sites pertinent to the material they are currently covering into the CS system. The provider, possibly with the help of special partners (who pull in additional related material to enhance the learning experience), assembles and updates the CS School Pages for each customer so that the helpful information is always available and up-to-date. Tia has requested help with some new concepts presented in her math class, and Jim uses the information collected on the current material pages of the math section of her updated School Page to help improve her understanding. Jim scans the performance pages as well, and notes that Tia's recent quiz grades are decent but could certainly be improved, so he schedules recurring homework monitoring and help sessions with her for the next several weeks, and allows this information to be provided to her teacher so that she can be aware of their extra efforts. The School Page keeps track of a wide variety of information regarding each student's progress. This information can be viewed manually, or can be selected to be continually summarized and provided to the parents if they wish, such as when a student is having some problems. Alerts can be pre-set based on a variety of triggers (e.g., grades falling below a "B").

Martha sets up a conference with her two sisters after dinner, and they discuss their parents' upcoming 50th anniversary, making plans and coordinating tasks via their respective Planners. To keep the upcoming celebration a surprise, they use the Security component's Privacy Block feature to keep all related Calendar entries from showing up on their parents' Calendar, which they normally select to be auto-sync'ed such that it can maintain a view of each of their own Calendars. Privacy Block is used to maintain privacy via a variety of techniques depending on the circumstances. For example, it can be used to block others from seeing one or more stored items (individually selected to form a group, or set up as being related). It can also be set to obscure information in a number of ways. Additionally, it can provide deceptive information to others, depending on relative privilege & associated policy (although there are externally imposed limits on this).

Tom watches television content accumulated on the family DVR over the last several days according to his personal preferences, flipping between recorded shows, fast-forwarding past boring sections, and re-winding to see some scenes twice. As he watches, he casually selects associated web content to be bookmarked in his personal Video Page. The Video Page maintained by the Entertainment component for each viewer incorporates self-organizing features so that the viewer can keep links associated with various shows, actors, topics, and genres separate while being cross-related as appropriate. Another of the many internal web pages generated, managed, and made available by the CS service, the Video Page is closely integrated with the DVR-related (and other video-related) features of the Entertainment component.

Jason comes in late that night. His entry into the house is noted and authenticated by the Security component, and is subsequently chimed by the Butler to his parents (who are already in bed). Megan returns late to her apartment as well, as she decided to visit a club with her friends after their dinner. Often she telephones her mother in the evening, as they are very close, but the hour is too late for that, and for such occasions they have prearranged for the Butler to chime her return as well.

That night, the family members sleep while the CS continues to perform certain necessary operations standard security/functional verifications, and to any deferred special checks such as the in-depth scanning & integrity verification for Jim's PC tasked earlier. They remain unaware of the various checks and actions taking place, except for summary results recorded in the CS status log, which they may later view. The CS service Security component conducts after-hours data backups. The Physical Security Sub-module of the Security component monitors the physical security system of the family home and the wireless security system at Megan's apartment. The Communications component stores and prioritizes received messages, which are scanned for viruses by the Security component. Content is downloaded according to the preferences of various users and stored for later use, mediated and cryptographically locked by the DRM module of the Security component. Various additional modules of the Security component monitor the home for potential cyber-intrusions and check for data tampering, malware such as viruses, incursions of undesirable software such as spy-ware, etc. The Bill Payer component makes payments incurred during the day, such as for downloaded DRM'ed content that was actually listened to or viewed. Similarly, other CS components conduct off-hour functions as programmed. A set of changeable heuristic tests is externally applied to the various components to help ensure that they are functioning properly. Other verifications are based on cryptographic principles in conjunction with change logs, ensuring that the only changes made to key system elements are those which were proper and traceable to authorized log events (or hashes/digests).

If any problems are found, the service is designed so that the provider is generally able to diagnose and remedy the situation remotely. Only in rare cases might the family, or at least the parents, have to be alerted for safety's sake. Even then, the CS service is designed to be placed in whichever of several available "safe modes" is appropriate (until a complete restoration to proper functioning can be obtained).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A computer-implemented method for providing electronic education service to a user, comprising:
    identifying a target education topic for the user;
    obtaining user profile information associated with the user from a database communicatively coupled to the electronic education service;
    identifying a plurality of tasks to provide the target education topic based on the identified target education topic and the obtained user profile information, said identifying comprising:
        identifying tasks to generate an education plan for the target education topic;
        identifying at least one resource for educational materials specified by the education plan; and
        identifying tasks to provide the target education topic to the user based on the education plan;
    requesting execution of actions by application service providing modules executed by a computer processor, other than the electronic education service, to carry out the identified tasks to provide the target education topic to the user;
    receiving status information from the application service providing modules based on the execution of actions by the application service providing modules; and
    updating the education plan based on the received status information.

2. The method of claim 1 wherein identifying a target education topic for the user comprises receiving a request for the target education topic from the user.

3. The method of claim 1 wherein identifying a target education topic for the user comprises:
    receiving information identifying educational material available from a resource related to an education topic;
    identifying a candidate education topic for the user based on the received information from the resource and the user profile information;
    suggesting the candidate education topic to the user; and
    receiving a request from the user designating the candidate education topic as the target education topic.

4. The method of claim 1 wherein requesting execution of actions includes requesting acquisition of the educational materials specified by the education plan from the identified at least one resource.

5. The method of claim 1 wherein the status information includes information related to completion of portions of the target education topic by the user and wherein updating the education plan includes updating the user profile information associated with the user based on the information related to completion of portions of the target education topic.

6. The method of claim 1 wherein identifying tasks to generate an education plan further comprises identifying a task to obtain approval, from an authorized user different from the user, for providing the target education topic to the user based on the user profile information.

7. The method of claim 1 wherein identifying tasks to provide the target education topic to the user includes identifying tasks to obtain input from the user and/or provide output to the user and wherein the method further comprises associating one of a plurality of available personalities with the electronic education service and wherein identifying tasks to obtain input from the user and/or provide output to the user comprises identifying tasks to obtain input from the user and/or provide output to the user based on the associated one of the available personalities.

8. The method of claim 7 wherein the associated one of the available personalities defines at least one of an accent, a communication syntax, a vocabulary, a sense of urgency, a speed of communication, a timing pattern of communication, a level of detail of communication and/or a preciseness of communication by the electronic arranger to the user.

9. The method of claim 1 wherein identifying tasks to generate an education plan includes:
    identifying a type of the target education topic; and
    identifying tasks to generate the education plan based on the target education topic; and
    wherein the method further comprises generating the education plan.

10. The method of claim 9 wherein generating the education plan comprises:
    selecting a plan framework from a plurality of predetermined plan frameworks based on the identified type of the target education topic;
    determining modifiers for the selected plan framework based on the obtained user profile information; and
    generating the education plan based on the selected plan framework and the determined modifiers.

11. The method of claim 1 further comprising:
    determining a context for the electronic education service; and
    updating the context based on the identified target education topic; and
    wherein the method further comprises generating the education plan based on the determined context of the electronic education service.

12. The method of claim 1, further comprising:
    defining sharing rules limiting sharing of the education plan; and
    providing the education plan to a requesting user based on the determined sharing rules.

13. The method of claim 1 wherein identifying a plurality of tasks and/or requesting execution of actions further comprises:
    obtaining information regarding prior requests for provision of target education topics to the user; and
    identifying the plurality of tasks and/or requesting execution of actions based on the obtained information regarding prior requests.

14. The method of claim 1 further comprising:
    determining a context for the electronic education service; and
    updating the context based on the identified target education topic; and wherein identifying a plurality of tasks further comprises:
determining a plurality of options for the plurality of tasks based on the context;
prioritizing the plurality of options;
requesting dynamic context information from the application service providing modules; and
identifying one of the plurality of options as the plurality of tasks based on the requested dynamic context information.

15. A method according to claim 11, wherein the context for the electronic education service comprises detailed internal conditions, indications, and/or assessments at one or more points and/or hierarchies within the framework.

16. A computer program product for providing an electronic education service to a user, the computer program product comprising computer program code embodied in a computer-readable medium, the computer program code configured to perform the method of claim 1.

17. A computer system that is configured to perform the method of claim 1.

* * * * *